J. W. Oulton. Thill Coupling.

No. 120,091.  Patented Oct. 17, 1871.

UNITED STATES PATENT OFFICE.

JAMES W. OULTON, OF AMHERST, CANADA.

IMPROVEMENT IN THILL-COUPLINGS.

Specification forming part of Letters Patent No. 120,091, dated October 17, 1871.

*To all whom it may concern:*

Be it known that I, JAMES W. OULTON, of Amherst, Nova Scotia, in the Dominion of Canada, have invented a new and useful Improvement in Thill-Coupling; and I do hereby declare that the following is a full, clear, and exact description thereof, which will enable others skilled in the art to make and use the same, reference being had to the accompanying drawing forming part of this specification, in which—

Figure 1:
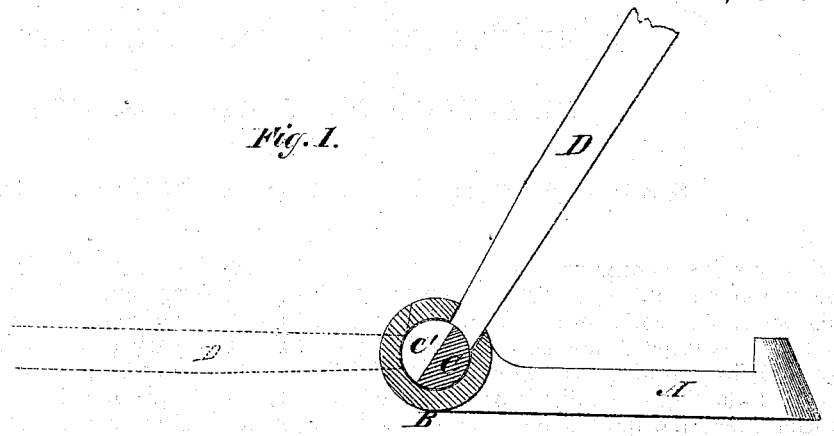
Figure 2:
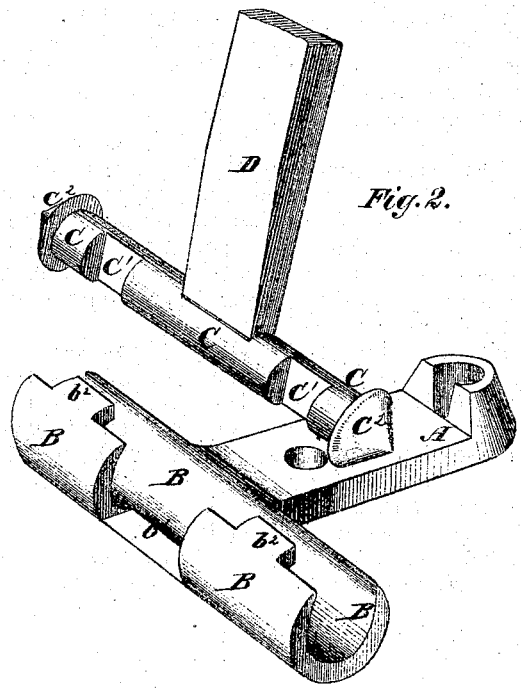

Figure 1 is a detail sectional view of my improved thill-coupling. Fig. 2 is a perspective view of the same, the parts being shown detached.

Similar letters of reference indicate corresponding parts.

My invention has for its object to furnish a simple, strong, durable, convenient, and cheap thill coupling, and which shall be so constructed as to hold the thills securely when in a working position, and which will allow the thills to be instantly detached when raised into a vertical position; and it consists in the coupling constructed and operating as hereinafter more fully described.

A represents the yoke that passes beneath the axle and receives the arms of the clip. The forward end of the yoke A is extended, and has a cross-head, B, formed upon it. The cross-head B is perforated longitudinally, and is made open upon its upper side, as shown in Figs. 1 and 2, to receive the cross-head C of the thill-iron D. The forward side of the cross-head B has a deep notch, $b^1$, formed in it to receive the thill-iron D, and has rearwardly-projecting lugs $b^2$ formed upon its edge to keep the cross-head C in place when the thills are in a working position. The cross-head C is made round to fit into the cavity in the cross-head B, and has notches $c^1$ formed in it in such position that when the thills are raised into an upright position the said notches $c^1$ may be in proper position to receive the lugs $b^2$, so that the cross-head C may be conveniently slipped into the cavity of the cross-head B.

By this construction when the thills are in a working position it will be impossible for the coupling to become detached, and at the same time the coupling will have a long bearing.

Upon the ends of the cross-head C are formed heads $c^2$, which rest against the ends of the cross-head B and keep the coupling from working laterally.

Having thus described my invention, I claim as new and desire to secure by Letters Patent—

The thill cross-head C $c^1$ $c^2$ and clip B $b^1$ $b^2$, when combined and arranged with the axle-yoke A, as and for the purpose specified.

JAMES W. OULTON.

Witnesses:
  J. EDWARD PAGE,
  E. R. CURTIS.

(31)